Oct. 4, 1960 A. H. FAULKNER 2,955,164

TRANSISTORIZED STOPPING CIRCUIT FOR ELECTROMAGNETIC SWITCH

Filed Feb. 13, 1957

INVENTOR.

Alfred H. Faulkner

BY C. R. Sejos

Atty.

2,955,164
Patented Oct. 4, 1960

2,955,164

TRANSISTORIZED STOPPING CIRCUIT FOR ELECTROMAGNETIC SWITCH

Alfred H. Faulkner, Chicago, Ill., assignor to Automatic Electric Laboratories, Inc., a corporation of Delaware Filed Feb. 13, 1957, Ser. No. 639,881
14 Claims. (Cl. 179—18)

This invention relates in general to stopping circuits for use in automatic hunting switches which are automatically operated in a hunting movement until an idle outlet is found.

More specifically, the invention relates to an improved circuit arrangement for a selector switch, wherein a transistor is used in the stopping circuit in place of the well-known stopping relay.

The conventional battery-searching selector switch used in the telephone industry has met with considerable disfavor for some years due to the deficiencies of the stopping circuit attributable to the high speed of this type of switch. The adjustment of the stopping relay has been found to be very troublesome, too stiff an adjustment making the relay too slow to stop the switch on the first idle trunk, and too light an adjustment making it possible for two selectors to simultaneously test and switch-through on the same idle trunk. Common practice has been to adjust this relay so that it will operate at approximately 29 milliamperes, thereby making sure that switch-through occurs at the first idle trunk. However, since the steady state current in each of two test relays that simultaneously test the same trunk is 40 milliamperes, double connections are not precluded by the 29 milliampere margin.

Accordingly, it is the primary object of this invention to provide an improved stopping-circuit arrangement for selector switches of the type described, whereby switch-through on the first idle trunk is assured, while double stopping is prevented.

One feature of the invention is the provision of a junction transistor of the n-p-n type in place of the conventional stopping relay, the emitter-collector path of said transistor acting as a shunt circuit for the switch-through relay until the control wiper tests an idle trunk, whereupon the transistor bias is changed in such a manner as to effectively cut-off the transistor, thereby removing said shunt and permitting said switch-through relay to operate.

Another feature of the invention is the provision of the above described junction transistor together with a point contact transistor, said point contact transistor being connected in the stopping circuit and arranged to cause the cut-off of said junction transistor when an idle trunk is found.

Other objects and features of my invention will become evident upon examination of the following description, taken in conjunction with the accompanying drawings, in which:

Fig. 1 shows a schematic circuit diagram of a battery searching selector, including the transistor stopping circuit, and Fig. 2 shows the same selector-switch with a modified stopping circuit employing two transistors.

The selector shown in Fig. 1 operates in the conventional manner up to the point of testing for an idle trunk. The switch is seized responsive to initiation of a call, by a closed loop being connected across line leads 1 and 3, and ground being connected to control lead 2. Relays 30, 40 and 50 operate responsive to said seizure. When the calling subscriber dials the first digit, relay 30 follows the dial pulses, and ground at contact 25 causes the pulsing of vertical magnet 70 in the well-known manner. After vertical stepping, relay 50 restores and completes the self-interrupted pulsing circuit of rotary magnet 80. The wipers are thereby moved rotary, with control wiper 50 testing for an idle trunk. When an idle trunk is found, battery potential is connected through wiper 5 and contact 41 to base of transistor 10, changing the bias on the transistor. The transistor is thereby cut-off, and the emitter-collector path (15—16) no longer acts as a shunt for relay 20, whereupon relay 20 operates and switches the incoming lines through to the outgoing lines in the well-known manner.

*Detailed description*

Figure 1:
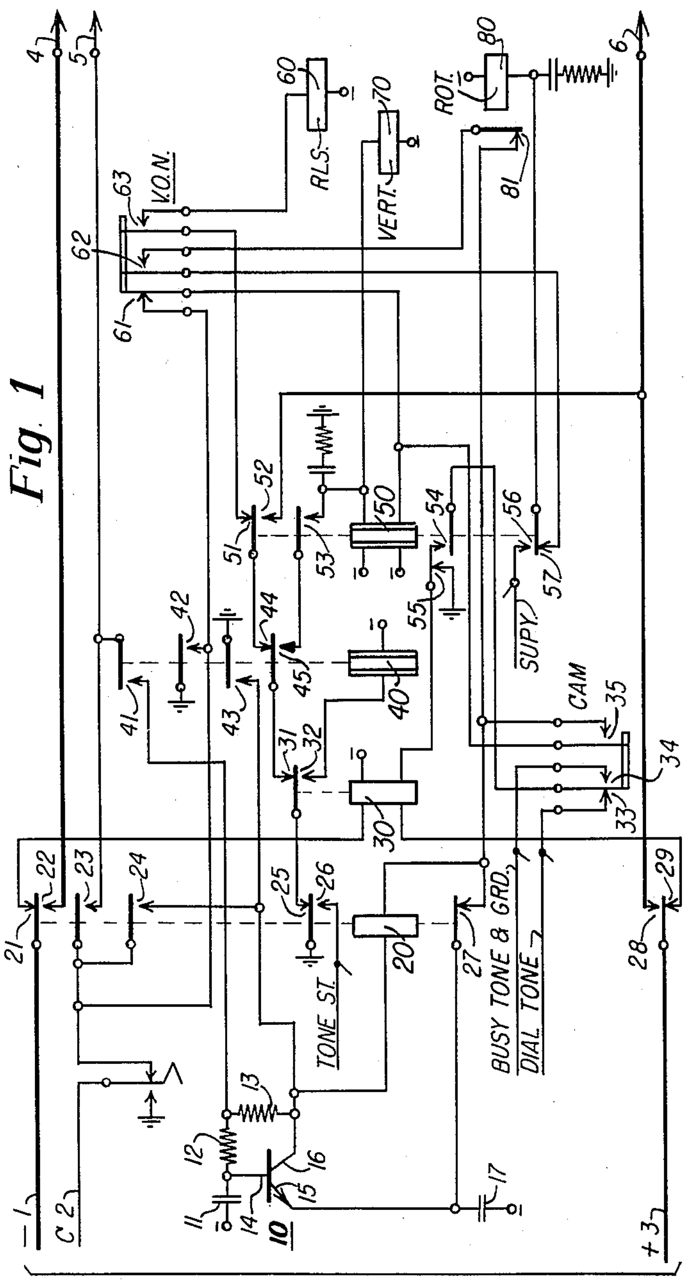

Let us now assume that the selector shown in Fig. 1 has just been seized responsive to an incoming call. A closed loop is thereby placed across leads 1 and 3, and lead 2 is momentarily grounded, in the well-known manner. Relay 30 operates over a circuit including leads 1 and 3, and contacts 21, 29 and 55; and relay 50 operates over its bottom winding, through contact 61 of the vertical-off-normal spring, to ground on lead 2.

Relay 30 operates, closing contact 32, to thereby complete an obvious operating circuit for slow-release relay 40. Relay 50 operates, closing contacts 52, 53, 54, and 56; and opening contacts 51, 55, and 57. The holding ground for relay 30 is thereby transferred from ground at contact 55 to dial tone and ground over an obvious circuit including contacts 33 and 54; and contact 56 completes an obvious circuit for operating a supervisory signal in series with rotary magnet 80, magnet 80 being margined so as not to operate over this circuit. The other contacts of relay 50 do not effect the circuit at this time.

Relay 40 operates, and the contacts associated therewith cause the following operations. Contact 41 connects control lead wiper 5 to the junction point of resistors 12 and 13; contact 42 places ground on control lead 2, to hold relay 50 and the preceding switches operated; contact 43 grounds collector 16 of transistor 10 over an obvious circuit; contact 44 opens a further point in the operating circuit of release magnet 60; and contact 45 completes a point in the pulsing circuits of relay 50 and vertical magnet 70.

The calling party, upon hearing the above mentioned dial tone, dials the first digit. Each dial pulse causes relay 30 to restore and then reoperate in the well-known manner. Each restoration of relay 30 causes the operation of vertical magnet 70 over a circuit including contacts 25, 31, 45 and 53; and each reoperation of relay 30 causes slow-release relay 40 to receive a pulse, to thereby hold relay 40 operated. As the vertical magnet operates, and the switch wipers take the first vertical step, the vertical off-normal springs are operated. Contact 61 is thereby opened, opening the original operating circuit for relay 50, whereafter slow-release relay 50 is held operated by pulses received over its top winding during vertical stepping. Contact 62 prepares a point in the operating circuit of rotary magnet 80. Contact 63 prepares a point in the circuit of release magnet 60.

Following the last pulse of the first digit, and the corresponding last reoperation of relay 30, and after the slow-release interval of relay 50, relay 50 restores. The circuits including contacts 51, 52 and 53 are incomplete at this time. Contacts 54 and 55 again cause a transfer of the holding ground for relay 30, this time changing to ground at contact 55, the dial tone being thereby removed from the line. Contact 57 closes a circuit extending from battery and rotary magnet 80, through contacts 57, 62 and 81, through contact 27 and relay 20 in parallel with a circuit including emitter 15, base 14 and collector 16 of transistor 10, and then through contact 43 to ground.

Transistor 10 is a type n-p-n junction transistor, and is biased in the conductive direction in the above described circuit. Thus, the low resistance path including emitter 15 and collector 16 acts as a shunt for relay 20, thereby permitting rotary magnet 80 to operate. It should be noted here that relay 20 will operate in series with magnet 80, but magnet 80 is margined so as to not operate in series with relay 20. Magnet 80 operates over this self-interrupting circuit, thereby causing the rotary stepping of wipers 4, 5 and 6, in the well-known manner. Capacitor 17 is provided to minimize transient voltages which may be produced as a result of the self-interrupted operation of rotary magnet 80.

Since this is a battery-searching switch, the rotary operation continues until control wiper 5 engages a contact having resistance battery connected thereto. The resistance battery condition indicates an idle trunk. If no such idle trunk is engaged, the wipers will rotate to the eleventh rotary position, where the cam springs operate. In that event, contact 35 completes a circuit for operating relay 50, including the bottom winding of relay 50, contacts 35 and 27, emitter 15 and collector 16 of the transistor, and contact 43; and contact 34 of the cam springs completes a point in the busy tone circuit, said circuit being completed at contact 54 when relay 50 operates.

Upon receipt of the busy tone, following operation of relay 50 over the above described circuit, the calling party restores his handset, thereby opening the loop to relay 30 and causing relay 30 to restore. Restoration of relay 30 causes relay 40 to restore. Contact 43 of relay 40 opens the holding ground for relay 50, but slow-release relay 50 does not immediately restore. Thus, a circuit is completed including contacts 25, 31, 44, and 52, and the eleventh contact of the contact bank associated with wiper 6, for operating an overflow meter (not shown). When relay 50 does restore, a circuit is completed for operating release magnet 60, including contacts 25, 31, 44, 51, and 63. Magnet 60 then operates, causing the switch to normalize in the well-known manner.

Now let us assume that resistance battery is contacted by wiper 5 during the rotary movement of the switch wipers. When wiper 5 engages resistance battery, it swings negative rapidly to a final value dependent on the ratio of resistance 13 to the resistance of the relay coil in the succeeding switch. For example, assume that the negative battery in the succeeding switch is connected through a 500 ohm relay coil, that resistance 13 is 500 ohms, and that a 48 volt battery is used. It is obvious that the potential on wiper 5 (and correspondingly, on base 14 and emitter 15 of transistor 10) changes from near ground to approximately −24 v. As a result, there is a potential drop of approximately 24 v. across relay 20 and across magnet 80. Relay 20 is adjusted to operate at 24 v., but magnet 80 does not operate.

Relay 20 operates, and the contacts associated therewith cause the following operations: contacts 22 and 28 connect incoming line leads 1 and 3 to wipers 4 and 6, respectively; contacts 21 and 29 open the circuit of relay 30, causing relay 30 to restore; contact 23 connects control lead 2 to control lead wiper 5, thereby extending ground to the succeeding switch in the well-known manner; contact 24 completes a point in the locking circuit of relay 20; contact 25 opens to remove ground from the release magnet circuit and thereby prevent the switch from normalizing when relays 30 and 40 restore; and contact 27 opens the circuit to emitter 15, thereby preventing transistor 10 from shunting relay 20 and causing magnet 80 to operate when ground on lead 2 again causes the transistor to be biased in the conductive direction.

Relays 30 and 40 restore following the operation of relay 20, whereafter relay 20 is the only relay operated in the circuit. Upon termination of the call, and removal of ground from control lead 2, relay 20 restores. Contact 25 then completes the operating circuit of release magnet 60, causing the switch to normalize.

Let us now assume that two selector switches such as shown in Fig. 1 are operated simultaneously, and that the selectors simultaneously test the same idle trunk. In that case, resistor 13 in one of the selectors is connected in parallel with resistor 13 in the other selector, and this combination of parallel resistors is connected in series with the resistance and battery in the succeeding switch (not shown). Assuming that each of these three resistors has a resistance of 500 ohms, it is obvious that the potential on wiper 5 in either of the two selectors (and correspondingly, on base 14 and emitter 15 of transistor 10) changes from near ground to approximately −16 v. As a result, there is a potential drop of approximately 16 v. across relay 20 and a potential drop of approximately 32 v. across magnet 80. Relay 20 does not operate, whereas magnet 80 does operate and step the corresponding wipers to the next succeeding switch bank contact. Thus, double stopping is prevented.

In the above few paragraphs, I have described the change in bias potential that occurs when the selector tests an idle trunk. The potential on wiper 5 swings from ground to −24 v. in the normal case, or from ground to −16 v. in the event that two selectors simultaneously test the same idle trunk. In order to prevent relay 20 from operating in the event of wiper overthrow, I have provided a time delay circuit consisting of resistance 12 and capacitor 11. These components, which prevent an instantaneous change of potential on base 14, have values such that switch-through on a busy trunk due to wiper overthrow will not occur, whereas the switch will stop on the first idle trunk. Thus, the timing of the circuit is conveniently predetermined, and adjustment of the relays and other components is substantially eliminated since the values of the timing-circuit-components are not subject to appreciable change.

Figure 2:
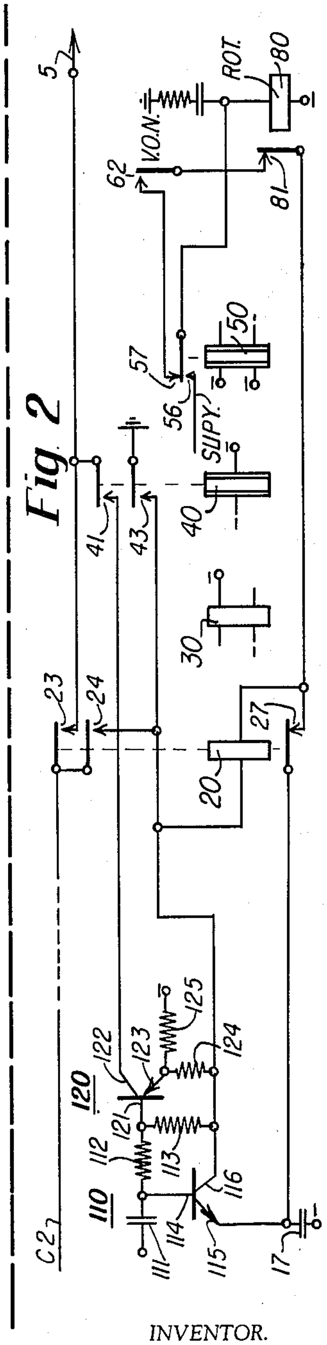

Now let us examine the circuit arrangement of Fig. 2, in which I have shown an alternate stopping circuit for the selector shown in Fig. 1. Only those components that are essential to the operation of the stopping circuit have been shown, and the same identifying numbers have been used.

Upon seizure of the selector, relays 30, 40, and 50 operate as described above. The switch wipers are then stepped vertically responsive to a dialled digit, whereafter relay 50 restores to complete the operating circuit of rotary magnet 80. This circuit extends from battery at magnet 80 through contacts 57, 62, 81; through relay 20 in parallel with contact 27, emitter 115, base 114 and collector 116 of transistor 110; and the through contact 43 to ground. Transistor 110 is biased in a conductive direction over this circuit, and effectively shunts relay 20 to prevent it from operating, while permitting magnet 80 to operate.

Magnet 80 operates over this self-interrupted circuit, thereby causing the rotary stepping of the switch wipers, until wiper 5 engages a contact having resistance battery connected thereto. When this occurs, current flows from ground through resistor 113, and through the base-collector path (121—122) of point contact transistor 120 to contact 41 and control wiper 5 to battery. By suitably proportioning base resistor 113 to the biasing resistors 124 and 125 in the emitter circuit, the collector circuit is made bi-stable. Thus, when current flows in the base-collector path as described above, the voltage drop across resistor 113 reduces the bias on emitter 123 and eventually results in a trigger action which switches collector 122 from the low current stable condition to the high current stable condition. The large voltage drop thus produced across resistor 113 cuts off transistor 110 to stop the rotary motion, as described above with reference to Fig. 1.

Should double testing occur, the collectors such as 122 of two transistors such as 120 would share a common load over their respective control wipers. With a suitable choice of circuit component values, the circuit can be arranged so that only one of these two transistors will switch to the high current stable condition. Thus, transistor 110 in one switch is cut-off and the corresponding transistor 110 in the other switch remains conductive, with the result that double stopping is prevented without reliance on the proper margining of the rotary magnets.

What has been described is considered to be the preferred embodiment of my invention, but it should be understood that modifications may be made in the structure and organization of my invention without departing from the scope thereof as defined in the appended claims.

What I claim is:

1. In a stepping switch having a plurality of bank contacts associated therewith: a switch wiper; an electromagnet for stepping said wiper over said contacts; a first circuit comprising said electromagnet and a resistance, said resistance having a magnitude such that said electromagnet is prevented from operating over said first circuit; a transistor comprising emitter and collector electrodes; a multiple circuit comprising said emitter and collector electrodes connected in parallel with said resistance; a voltage source connected to one of said contacts for placing a potential on said one contact, said source further connected so as to bias said transistor in a conductive direction, and said source further connected so as to operate said electromagnet over said multiple circuit and thereby step said wiper over said contacts; and means including said potential for changing said bias when said wiper reaches said one contact whereby said transistor is rendered less conductive, said electromagnet being thereafter inoperative over said multiple circuit.

2. In a stepping switch having a plurality of bank contacts associated therewith as claimed in claim 1, circuit means connected to said transistor for preventing said bias from changing instantaneously, thereby preventing said electromagnet from being rendered inoperative in the event that said wiper momentarily engages said one contact as a result of wiper overthrow.

3. In a stepping switch having a plurality of bank contacts associated therewith: a switch wiper; a first electromagnet for stepping said wiper over said contacts; a second electromagnet; a series circuit comprising said first and said second electromagnets, said second electromagnet having an impedance such that said first electromagnet is prevented from operating over said series circuit; a transistor comprising emitter and collector electrodes; a multiple circuit comprising said electrodes connected in parallel with said second electromagnet; a voltage source connected to one of said bank contacts for placing a potential on said one contact, said source further connected so as to bias said transistor in a conductive direction, and said source further connected so as to operate said first electromagnet over said multiple circuit and thereby step said wiper over said contacts; contact means associated with said second electromagnet for opening said multiple circuit; and means including said potential for changing said bias when said wiper reaches said one contact whereby said transistor is rendered less conductive, said second electromagnet being thereby operated over said series circuit to open said multiple circuit and terminate the operation of said first electromagnet.

4. In a stepping switch having a plurality of bank contacts associated therewith: a switch wiper; an electromagnet for stepping said wiper over said contacts; an asymmetrically conducting device; a source of potential; a series circuit including said electromagnet, said device, and said source of potential for biasing said device in a conductive direction and thereby operating said electromagnet over said circuit, said wiper being thereby stepped over said contacts; and means including said source of potential for changing said bias and thereby rendering said device less conductive when said wiper reaches a predetermined one of said contacts having said potential thereon, thereby terminating the operation of said electromagnet and the corresponding stepping of said wiper.

5. In a battery-searching selector switch of the type used in telephony wherein a plurality of switch wipers including a test wiper are moved vertically in response to digital impulses and then rotated by electromagnetic means over bank contacts until battery potential is encountered by said test wiper, the improvement comprising an asymmetrically conducting device connected to said test wiper and to the electromagnetic means that causes said rotation, means for biasing said device in a conductive direction to thereby cause the operation of said electromagnetic means, and means for changing said bias when said test wiper encounters battery potential to thereby render said device less conductive and prevent further operation of said electromagnetic means.

6. In a selector switch having a plurality of bank contacts associated therewith, a plurality of incoming leads, a plurality of switch wipers, means responsive to digital impulses received over predetermined ones of said leads for causing said wipers to be stepped vertically, an electromagnet, means effective upon operation of said electromagnet for causing rotary stepping of said wipers over said bank contacts, a relay, a source of potential, an asymmetrically conducting device, a circuit wherein the parallel combination of said device and said relay is connected in series with said electromagnet and said source of potential, means including said source of potential and said circuit for placing a first bias on said device, means effective upon termination of said vertical stepping for completing said circuit, said first bias thereupon rendering said device sufficiently conductive to cause the operation of said electromagnet over said circuit and the corresponding rotary stepping of said wipers, means including said source of potential for placing a second bias on said device when a particular one of said wipers encounters one of said bank contacts marked with said potential, said second bias thereupon rendering said device less conductive to thereby operate said relay and prevent further operation of said electromagnet, and means associated with said relay effective upon operation thereof to disconnect said device from said circuit and connect said incoming leads to said wipers.

7. In combination, a plurality of electromechanical stepping switches, trunk lines accessible to said switches, means in each switch including a conductively biased asymmetrically conducting device for causing said switches to hunt for idle trunk lines, and means in each switch including said device actuated by two switches simultaneously finding the same idle trunk to rotate said switches over said idle trunk.

8. In combination, a plurality of electromechanical stepping switches, trunk lines accessible to said switches, means in each switch including a conductively biased asymmetrically conducting device for causing said switches to hunt for idle trunk lines, and means in each of said switches for changing the bias on the device corresponding to the switch that finds an idle trunk line, said last means effective when only one of said switches finds an idle trunk line to render the device therein less conductive to an extent that causes the trunk hunting of said one switch to be terminated, and effective when two or more of said switches simultaneously find the same idle trunk line to render the device in each of said two or more switches less conductive to an extent that causes the trunk hunting of none of said two or more switches to be terminated.

9. In a switching system, a plurality of trunk lines, an electromechanical switch having access to said trunk lines, a conductively biased asymmetrically conducting device in said switch, means in said switch including said device for causing said switch to hunt for idle trunk lines, means in said switch effective when said switch finds an idle trunk for changing said bias and thereby rendering said device less effective to thereby terminate said trunk hunting, and circuit means connected to said device for preventing said device from becoming instantaneously less conductive, whereby said trunk hunting is prevented from being terminated in the event that said switch prematurely finds an idle trunk.

10. In a switching system as claimed in claim 9, wherein said last means comprises a switching device of the asymmetrically conducting type that has a high-current stable operating condition and a low-current stable operating condition, and means responsive to sensing of an idle trunk by said switch to change said operating conditions.

11. In a switching system as claimed in claim 10, a plurality of other electromechanical switches having access to said trunk lines and each having a construction identical to said first electromechanical switch, and said switching device individually associated with said plurality of electromagnetic switches rendered effective when two or more of said switches simultaneously find the same idle trunk to permit only one of said switching devices to change from said one operating condition to said other operating condition.

12. In a switching system, a plurality of outlets, an automatic switch having means for operating said switch in a hunting operation to select an idle one of said outlets, means for seizing said switch, a circuit in said switch for controlling said hunting operation, means for completing said circuit, a transistor included in said circuit biased in a conducting direction responsive to the completion of said circuit for initiating and controlling said hunting operation, means responsive to said switch finding an idle outlet for rendering said transistor less conducting to disable said circuit and stop said hunting operation, and connecting means in said switch operative responsive to said transistor becoming less conducting for seizing said idle outlet.

13. In a switching system as claimed in claim 12, wherein said connecting means includes a switching relay and a shunting circuit for said relay said shunting circuit being effective to prevent operating of said relay while said transistor is conducting and ineffective while said transistor is less conducting.

14. In a switching system as claimed in claim 13 including contacts opened responsive to the operation of said relay for disabling said transistor and said hunting circuit.

References Cited in the file of this patent

UNITED STATES PATENTS

| | | |
|---|---|---|
| 1,941,254 | Flad | Dec. 26, 1933 |
| 2,576,097 | Bray et al. | Nov. 27, 1951 |
| 2,616,980 | Buchner | Nov. 4, 1952 |
| 2,662,119 | Buchner | Dec. 8, 1953 |
| 2,682,019 | Molnar | June 22, 1954 |
| 2,691,699 | Panzerbeiter | Oct. 12, 1954 |
| 2,706,222 | Bjornson | Apr. 12, 1955 |
| 2,713,615 | McCreary | July 19, 1955 |